Figure 1:
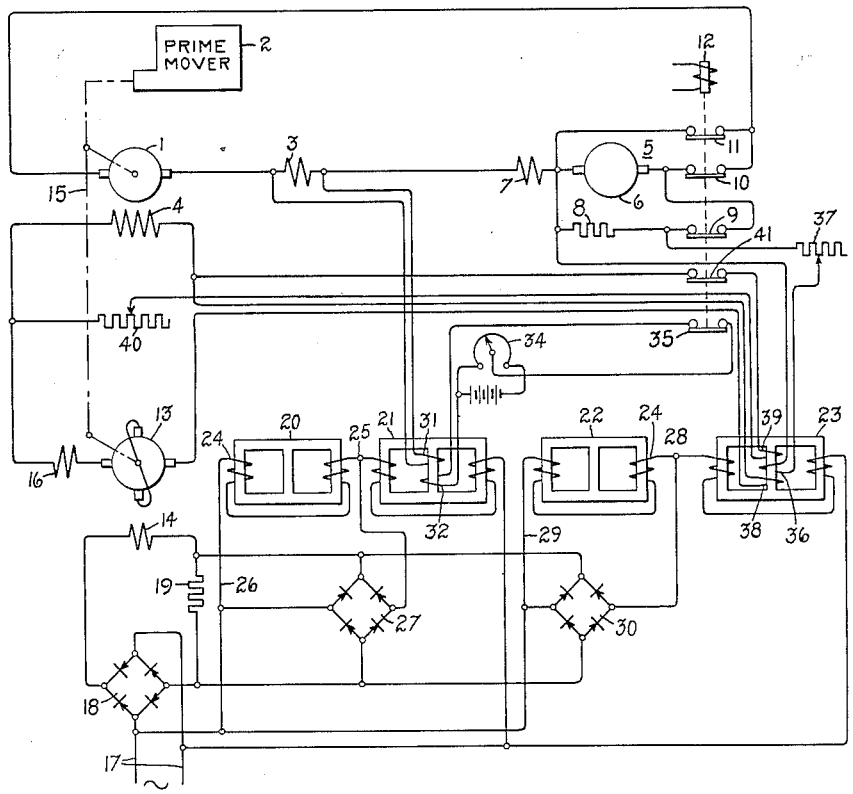

Feb. 3, 1953    A. V. JOHANSSON    2,627,597
DYNAMIC BRAKING CONTROL SYSTEM
Filed Feb. 14, 1951

Inventor:
August V. Johansson,
by Ernest C. Britton
His Attorney.

Patented Feb. 3, 1953

2,627,597

UNITED STATES PATENT OFFICE 2,627,597

DYNAMIC BRAKING CONTROL SYSTEM

August V. Johansson, Erie, Pa., assignor to General Electric Company, a corporation of New York Application February 14, 1951, Serial No. 210,954

14 Claims. (Cl. 318—365)

This invention relates to a dynamic braking control system for direct current electric motors and more particularly for self-powered vehicles such as diesel-electric locomotives.

One of the most advantageous features of diesel-electric locomotives utilizing traction motors of the direct current type is the availability of electric braking with the resultant reduction in mechanical brake wear and wheel slide. Electric braking, or dynamic braking as it is customarily referred to, is usually accomplished by connecting the armatures of the traction motors in a loop circuit with resistor grids to provide for dissipation of the power generated by the motors operating as generators, excitation during braking being provided by connecting the traction motor fields for separate excitation from the traction generator. However, the amount of braking effort available is limited by motor heating and commutation limitations as well as by the capacity of the resistor grids employed. In this connection, it will be readily apparent that the amount of power to be dissipated by the resistor grids, assuming a steady value of field excitation, is proportional to the square of the speed of the locomotive.

In the conventional dynamic braking control, the amount of braking effort at any particular time has been at the sole discretion of the engineman, manual operation of the braking controller handle determining the traction motor excitation. As pointed out above, however, the output of the traction motor during braking fed into a fixed resistance varies widely for a given excitation throughout the range of train speed at which dynamic braking is employed. The engineman thus has under his control sufficient excitation to obtain maximum allowable traction motor armature current and thus maximum braking effort at some minimum speed of the locomotive and, therefore, has available an excess of excitation at higher speeds which, if improperly employed, may result in damage to the traction motors through overheating, flashover, or in burn-out of the resistor grids. It has therefore been necessary for the engineman to closely observe the traction motor armature current ammeter in the locomotive cab and to manipulate the braking controller to adjust the motor excitation to prevent the motor armature current from exceeding the allowable limit with an increase in speed and to increase the motor excitation when the locomotive speed is reduced in order to maintain maximum allowable braking effort.

The present system, therefore, places a heavy burden on the engineman to insure that the allowable traction motor armature current during braking is not exceeded and has resulted in frequent damage to the traction motors and braking resistors due to carelessness on the part of the engineman. In this type of system, it is not desirable to provide an overload relay which would disconnect the braking circuit if the traction motor armature current exceeded the desirable limit, since it is considered dangerous to suddenly remove the complete braking effort as such removal with a long train behind the locomotive in mountainous territory might result in dangerous runouts of slack, possibly resulting in train derailment in extreme cases. A further disadvantage of the present system is the fact that on a railroad having frequent changes in gradient and frequent curves, the train speed will not be maintained constant and the engineman in order to provide continuous maximum braking effort must continually manipulate his braking controller to avoid excesses in traction motor armature current and furthermore, on heavy grades, where the dynamic braking alone is not sufficient and the train brakes must also be applied and released, the engineman may not be able to devote sufficient attention to controlling the electric braking.

It is therefore an object of this invention to provide a dynamic braking control system incorporating an automatic overriding control of traction motor excitation in order to limit the maximum traction motor armature current. This regulation of maximum motor armature current may be either independent of locomotive speed in order to provide substantially flat braking, or it may, if desired, be modulated by locomotive speed to provide tapered braking in order to secure maximum braking effort without exceeding the commutation and heating limitations of the traction motors.

This invention, in its broadest aspects, includes a main generator having a field exciting winding and a motor having an armature and a field exciting winding. During braking, the motor armature is connected in a loop circuit with a braking resistance and the motor field winding is connected for excitation from the main generator. The main generator field winding is energized by an exciter which, in turn, is provided with exciting field winding with means being provided for energizing this winding. In order to automatically provide a regulated maximum motor armature current limit during dynamic braking, a signal responsive to the output of the traction motors is utilized to modulate the excitation to the exciter so that the excitation supplied by the main generator to the field winding of the motor is in turn regulated to secure regulation of the motor armature current. If desired, the system may further incorporate modulation of the exciter excitation by a signal responsive to the vehicle speed so that tapered braking may be secured.

Further objects and advantages will become apparent and the invention will be better understood by reference to the following description and the accompanying drawing, and the features of novelty which characterize this invention will be pointed out with particularity in the claims annexed to and forming a part of this specification.

Figure 2:
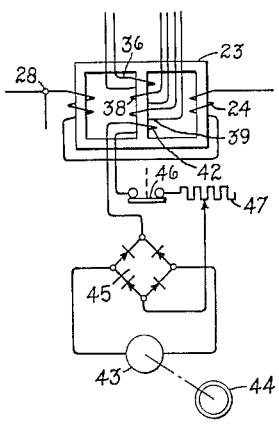

In the drawing, Fig. 1 is a schematic illustration of the dynamic braking control system of this invention; and Fig. 2 is likewise a schematic presentation of a modification of the circuit of Fig. 1 to provide tapered braking.

Referring now to Fig. 1, there is shown a direct current traction generator 1 mechanically driven by a suitable prime mover 2, which may be a diesel engine or a gas turbine. The traction generator 1 is provided with a series commutating field 3 and a separately excited shunt field 4. The traction generator 1 is arranged during motoring to energize the traction motors of the vehicle which are in turn connected to drive the vehicle wheels. One such traction motor 5 is here shown and is provided with an armature 6 and a field exciting winding 7. During dynamic braking, the armature 6 of the traction motor 5 is connected in a loop circuit with a braking resistance grid 8 and the field exciting winding 7 is connected for energization by the traction generator 1. This braking connection is accomplished by means of contacts 9, 10 and 11, which connects the resistor 8 across the motor armature 6, open the circuit from the armature 6 to the generator 1, connect the motor field winding 7 for direct energization from the generator 1. The contacts 9, 10 and 11 are actuated by contactor coil 12 which is energized from a source (not shown) responsive to operation of the engineman's controller.

The generator field exciting winding 4 is arranged for excitation by an exciter 13 which in turn is provided with a field exciting winding 14. The exciter 13 is also driven by the prime mover through a mechanical connection 15. The exciter 13 is shown to be an amplidyne type dynamoelectric machine which is desirable because of its rapid response and low excitation required. An amplidyne machine is defined as being an armature reaction excited dynamoelectric machine provided with compensation for secondary armature reaction, compensating field winding 16 serving this purpose. While an amplidyne type exciter is shown, it will be readily understood that any other conventional type of exciting machine may be utilized. The field winding 14 of the exciter 13 is arranged for excitation from an external alternating current source 17, for example, a 400-cycle source, through a full-wave rectifier 18. A resistor 19 is arranged in series with the exciter field winding 14 for a reason to be hereinafter described.

In order to provide for control of the dynamic braking circuit described above, two pairs of saturable core reactors 20 and 21, and 22 and 23 are provided. Each of the saturable core reactors 20 to 23 is provided with a 3-legged core having alternating current windings 24 arranged on the outer legs. The alternating current windings 24 of each of a pair of reactors 20 and 21 and 22 and 23 are respectively arranged in series and connected across the source 17 for energization. The output of the reactor pair 20 and 21 is taken across the reactor 20 from mid-point 25 between the adjacent coils 24 on reactors 20 and 21, and input line 26 leading to reactor 20. This output is fed to a full-wave rectifier 27, the output of which is connected across the resistor 19. The output of the reactor pair 22 and 23 is likewise connected across reactor 22 from mid-point 28 between adjacent alternating current windings 24 on reactors 22 and 23, and input line 29 of reactor 22. This output is fed to full-wave rectifier 30, the output of which is arranged in parallel with the output of full-wave rectifier 27.

In order to utilize the reactors 20 to 23 in the control of the dynamic braking system, which are already provided for the motoring control (not shown), a direct current winding 31 on the center leg of reactor 21 is connected for energization from generator commutating winding 3. This connection, therefore, measures the current in the motor field winding 7 which, during the braking connection, is the same as the generator armature current, through the voltage drop across the commutating field 3. This drop produces a current in direct current reactor coil 31 proportional to the current in the commutating field 3. It will be readily understood that direct current ampere turns on reactor 21 will tend to saturate the core of reactor 21 and thus increase the voltage across reactor 20 resulting in a higher direct current voltage being placed across resistor 19 through the full-wave rectifier 27. The voltage available for excitation of the exciter field winding 13 is dissipated in the winding 14 and the resistor 19. Therefore, if the voltage applied by full-wave rectifiers 27 and 30 to the resistor 19 increases, the current available to flow through exciter field winding 14 decreases. Thus an increase in current flow through the commutating field 3 of the generator 1 results in ampere turns of direct current being applied to D.-C. winding 31 of reactor 21 which further results in decreased excitation to the exciter 13 and, in turn, to the generator 1.

In order to provide for manual adjustment of the excitation supplied by the generator 1 to the motor field winding 7, another direct current winding 32 is provided on the center leg of the reactor 21 arranged additive to the winding 31. This winding is arranged for energization from a direct current source, such as battery 33, the energization being varied by means of potentiometer 34 operated by the engineman's braking controller. The connection between the direct current reactor coil 32 and the potentiometer 34 is through braking contact 35. It will now be readily apparent that the output of the full-wave rectifier 27 applied to the resistor 19 is proportional to the direct current ampere turns provided by direct current coils 31 and 32 on reactor 21. It will now be seen that if sufficient direct current ampere turns are applied to reactor 21 by the coil 32, the excitation of the generator 1 may be brought to such a low value that substantially no current will flow through the traction motor field 7. This is the condition rather closely achieved upon establishment of the braking connection where the engineman does not want to apply much braking effort to the locomotive in order to avoid a rapid run-in of slack. Manipulation of the potentiometer 34 by means of the engineman's braking controller permits the excitation supplied to the generator 1 to be increased, thus increasing the excitation on the traction motor field 7 to increase the braking effort. It will be readily apparent that the connection of the coil 31 across the generator commutating field winding 3 tends to maintain the motor field current constant at any particular value selected by the potentiometer 34.

It will now be readily apparent that with the system as thus far described, the engineman has complete control of the excitation of the traction motor 5 by virtue of the potentiometer 34 and thus, at high sepeeds, could select a value of excitation on the motor field winding 7 which would produce a motor armature current through resistor 8 which would be far above the allowable limit. In order to automatically limit the maximum armature current of traction motor 5 and thus, in effect, override the excitation called for by the operator by manipulation of potentiometer 34, a direct current winding 36 is provided on the center leg of reactor 23 connected across braking resistor 8. It will be readily understood that winding 36 may be connected across only a portion of a complete braking resistance grid rather than the complete unit, as shown in the drawing, and that a supplemental variable resistance 37 may be required for calibration purposes. The connection of the direct current reactor coil 36 across the braking resistor 8 measures the voltage drop across the resistor 8 which is proportional to the armature current of the motor 5 and thus provides direct current ampere turns on the reactor 23 proportional to the traction motor armature current. It is thus readily seen that an increase in armature current as measured by the voltage drop across the braking resistance 8 will result in increased voltage being applied across the resistance 19 by the rectifier 39 which will automatically decrease the excitation supplied by the generator 1 to the motor field winding 7 overriding the excitation called for by the potentiometer 34. This arrangement will therefore maintain a maximum motor armature current independent of the speed of the locomotive which is referred to as flat braking.

The prime mover 2 and, therefore, the generator 1 and exciter 13 are run at substantially constant speed during electric braking and, therefore, the motor field excitation required in braking varies over a range of about 6 to 1 throughout the speed range of the locomotive in order to obtain substantially constant maximum braking. It follows, therefore, that the excitation supplied to the exciter 13 must also vary over a wide range through the speed range of the locomotive in order to control the excitation of the motor 5 and to maintain the same motor armature current. This wide range of required excitation requires that the motor armature current signal applied to the direct current winding 36 on reactor 23 be further modulated by another signal proportional to the generator field current. This signal is provided by direct current winding 38 on reactor 23 which is arranged in series with the field winding 4 of generator 1. The direct current winding 38 is arranged in opposition to the motor armature current winding 36 so that the output of the rectifier 39 is proportional to the energization provided by these two windings. The algebraic sum of the ampere turns on reactor 23 fed from the winding 36 responsive to traction motor armature current and the ampere turns on reactor 23 fed by winding 38 responsive to generator field current, must be such at all train speeds as to sufficiently saturate reactor 23 to produce the required current in exciter field winding 14 and thus produce the required current in motor field winding 7 to maintain maximum motor armature current at all train speeds. For example, at low train speeds, a fixed value of motor armature current appears as direct current ampere turns on direct current reactor winding 36 in algebraic addition to the ampere turns on direct current winding 38. At these low train speeds, the current in generator field winding 4 for maximum braking current will be relatively large and, therefore, the current in exciter field winding 14 will also be relatively large requiring a relatively low value of voltage applied across resistor 19 and, therefore, relatively light saturation of reactor 23. At high train speeds, however, with the same maximum value of motor armature current desired, resulting in the same number of ampere turns on reactor 23 from winding 36, a relatively low generator and exciter field current is required, thus requiring a relatively high voltage to be applied across resistor 19. It is thus apparent that at low train speeds the relatively large ampere turns applied to reactor 23 by winding 36 must oppose the also relatively large ampere turns supplied by the winding 38 to produce the relatively low voltage across the resistor 19. Conversely, at high speeds, the ampere turns supplied by winding 36 must completely override the relatively low ampere turns supplied by winding 38 to produce the relatively high voltage required across resistor 19. It is thus seen that the windings 36 and 38 on the reactor 23 must be subtractive so that the system will produce substantially flat braking throughout the speed range of the locomotive, i. e., to regulate the system to produce essentially the same maximum traction motor armature current throughout the speed range.

Since the winding 38 energized by the current flowing in generator field winding 4 has a fixed number of turns and the current through it has a definite value for any generator excitation, there is no convenient method of adjusting the ampere turns in winding 38 for calibration since the relatively heavy current flow in this winding precludes the utilization of a series variable resistor. Therefore, in order to provide for calibration of the winding 38, an additional direct current winding 39 is provided on reactor 23 connected across the generator field winding 14 through variable resistance 40. This circuit is also arranged through a braking contactor 41. The direct current reactor winding 39 will also have current flowing therein directly proportional to the current flowing in the generator field winding 4 and thus to the current in the direct current reactor winding 38 and is used entirely to provide adjustment of the ampere turns provided by the winding 38.

It will now be readily apparent that the system as thus far described provides maximum motor armature current at all train speeds above same maximum speed, commonly referred to as flat braking, and with this braking being essentially independent of the speed of the locomotive. It will be seen that the point at which the signal produced by the voltage drop across the braking resistance 8 becomes effective to limit the motor armature current and the braking effort called for by the engineman's potentiometer 34 is dependent upon the adjustment of the variable resistance 37, which is preferably readjusted and not readily accessible for adjustment by the train crew.

While a system producing substantially flat braking effort is described above, it may be desirable to provide what is referred to as a tapered braking in order to provide a different maximum armature current at one end of the speed range than is provided at the other. This may be desirable since at high speed greater motor heating develops due to core losses whereas at low speeds the core losses are less and it is therefore permissible to increase the motor armature current to take full advantage of the motor rating. In order to provide tapered braking, the system of Fig. 1 may be modified as shown in Fig. 2, in which like elements are indicated by like reference numerals. In this arrangement, an additional direct current reactor winding 42 is provided on reactor 23 energized during braking from an axle generator 43 shown schematically as being driven by a wheel 44. The output of the axle generator 43 is fed to the direct current reactor coil 42 through a full-wave rectifier 45, braking contact 46, and calibrating resistor 47. Thus, ampere turns responsive to the locomotive speed are added to the ampere turns derived from the traction motor armature current so that at high train speeds the generator excitation will be further decreased to decrease the motor armature current below the maximum limit provided by the circuit of Fig. 1. It will be readily apparent that the tapered braking feature provided by the modification of Fig. 2 provides for greatly increasing the effective traction motor rating at low speeds while maintaining the previous rating at high speed braking. The introduction of a signal, such as the signal responsive to locomotive speed, from outside the limit system and unaffected by it is necessary in order to secure the tapered braking characteristic. Such an external system is needed since the limit system per se is fundamentally one in which an increase in motor current results through the reactor system in a decreased excitation until a balance is achieved for the particular condition existing. Thus, it will be seen that an increase in motor armature current at low train speeds where an increase in generator excitation would also be required to produce such an increase in motor armature current compared to high train speed operation is fundamentally opposite to the basic concept of the system and thus, the introduction of the signal responsive to train speed is essential.

An additional feature of this invention is the fact that either the embodiment of Fig. 1 or of Fig. 2 may be applied to an individual locomotive unit. Thus, when several locomotive units are coupled together for multiple-unit operation from a single cab, this system of braking control allows maximum braking effort to be developed on each unit individually. Formerly, with the braking solely under the control of the engineman, it was necessary in the case of multiple-unit operation to restrict the braking to the maximum allowable level of the individual unit having the lowest rating.

It will now be readily apparent that the dynamic braking control system described above, in automatically limiting the maximum traction motor armature current, prevents the engineman from applying excitation which would produce motor armature current above the allowable limit and furthermore relieves the engineman from the necessity for watching the traction motor ammeter in order to control the maximum braking effort.

While I have illustrated and described particular embodiments of this invention, modifications thereof will occur to those skilled in the art and I desire it to be understood, therefore, that this invention is not to be limited to the particular embodiments shown and I intend in the appended claims to cover all modifications which do not depart from the spirit and scope of this invention.

What I claim as new and desire to secure by Letters Patent of the United States is:

1. In a self-propelled vehicle, a generator having a field exciting winding, a traction motor connected to drive the wheels of said vehicle and having an armature and a field exciting winding, braking resistance means, means for connecting said motor armature in a loop circuit with said resistance means and for connecting said motor field winding for energization from said generator to provide a dynamic braking circuit, means for exciting said generator field winding, means responsive to the voltage drop across at least a portion of said resistance means for modulating said generator exciting means to regulate the excitation supplied by said generator to said motor field winding whereby the armature current of said motor is regulated during braking, and means responsive to the speed of said vehicle for further modulating said generator exciting means to affect the regulation of said motor armature current to provide tapered braking.

2. In a self-propelled vehicle, a generator having a field exciting winding, a traction motor connected to drive the wheels of said vehicle and having an armature and a field exciting winding, braking resistance means, means for connecting said motor armature in a loop circuit with said resistance means and for connecting said motor field winding for energization from said generator to provide a dynamic braking circuit, an exciter machine arranged for exciting said main generator field winding and having a field exciting winding, means for exciting said exciter field winding, means responsive to the voltage drop across at least a portion of said resistance means and connected to modulate said exciter field winding exciting means for regulating the excitation supplied by said generator to said motor field winding whereby the armature current of said motor is regulated during braking, and means responsive to the speed of said vehicle and connected to further modulate said exciter field winding exciting means for affecting the regulation of said motor armature current to provide tapered braking.

3. In combination, a generator having a field winding, a motor having an armature and a field exciting winding, braking resistance means, means for connecting said motor armature in a loop circuit with said resistance means and for connecting said motor field winding for excitation from said generator to provide a dynamic braking circuit, means for exciting said generator field winding, means responsive to the current flow in said resistance means for modulating said generator exciting means to regulate the excitation supplied by said generator to said motor field winding whereby the armature current of said motor is regulated during braking, and means responsive to generator field winding excitation for further modulating said generator field winding exciting means during braking, said last mentioned responsive means being in opposition to said first mentioned responsive means.

4. In combination, a main generator having a field exciting winding, a motor having an armature and a field exciting winding, braking resistance means, means for connecting said motor armature in a loop circuit with said resistance means and for connecting said motor field winding for excitation from said generator to provide a dynamic braking circuit, an exciter machine arranged for exciting said main generator field winding and having a field exciting winding, means for exciting said exciter field winding, means responsive to the voltage drop across at least a portion of said resistance means and connected to modulate said exciter field winding exciting means for regulating the excitation supplied by said main generator to said motor field winding whereby the armature currrent of said motor is regulated during braking, and means responsive to the output of said exciter and connected to further modulate said exciter field winding exciting means during braking, said last mentioned responsive means being in opposition to said first mentioned responsive means.

5. In combination, a main generator having a field exciting winding, a motor having an armature and a field exciting winding, braking resistance means, means for connecting said motor armature in a loop circuit with said resistance means and for connecting said motor field winding for excitation from said generator to provide a dynamic braking circuit, an exciter machine arranged for exciting said main generator field winding and having a field exciting winding, means for exciting said exciter field winding, means for measuring the voltage drop across at least a part of said resistance means, means for measuring the output of said exciter, and means differentially responsive to the signals from said voltage drop and said exciter output measuring means and connected to vary said exciter field exciting means whereby the energization supplied by said main generator to said motor field winding is regulated so that the armature current of said motor is automatically maintained substantially constant during braking.

6. In a self-propelled vehicle, a generator having a field exciting winding, a traction motor connected to drive the wheels of said vehicle and having an armature and a field exciting winding, braking resistance means, means for connecting said motor armature in a loop circuit with said resistance means and for connecting said motor field winding for energization from said generator to provide a dynamic braking circuit, an exciter machine arranged for exciting said main generator field winding and having a field exciting winding, means for exciting said exciter field winding, means for measuring the voltage drop across at least a part of said resistance means, means for measuring the speed of said vehicle, and means responsive to the signals from said voltage drop and said speed measuring means and connected to vary said exciter field exciting means whereby the energization supplied by said main generator to said motor field winding is regulated so that the armature current of said motor is automatically limited during braking to provide tapered braking.

7. In combination, a main generator having a field exciting winding, a motor having an armature and a field exciting winding, braking resistance means, means for connecting said motor armature in a loop circuit with said resistance means and for connecting said motor field winding for excitation from said generator to provide a dynamic braking circuit, an exciter machine arranged for exciting said main generator field winding and having a field exciting winding, means for exciting said exciter field exciting winding, means responsive to manual operation for controlling said exciter field exciting means, and means for automatically overriding said manual responsive means including means responsive to the voltage drop across at least a part of said resistance means and connected to modulate said exciter field exciting means whereby the excitation supplied by said generator to said motor field is regulated so that the armature current of said motor is automatically limited during braking.

8. In combination, a main generator having a field exciting winding, a motor having an armature and a field exciting winding, braking resistance means, means for connecting said motor armature in a loop circuit with said resistance means and for connecting said motor field winding for excitation from said main generator to provide a dynamic braking circuit, an exciter machine arranged for exciting said main generator field winding and having a field exciting winding, means for exciting said exciter field winding, and a saturable core reactor having an alternating current winding and a direct current winding, means for energizing said reactor alternating current winding, said reactor direct current winding being connected across at least a part of said resistance means for energization responsive to the voltage drop thereacross, said reactor alternating current winding being connected in circuit with said exciter field winding exciting means for varying the excitation of said exciter responsive to said voltage drop across said resistance means whereby the excitation supplied by said main generator to said motor field winding is regulated so that the armature current of said motor is automatically limited during braking.

9. In combination, a main generator having a field exciting winding, a motor having an armature and a field exciting winding, braking resistance means, means for connecting said motor armature in a loop circuit with said resistance means and for connecting said motor field winding for excitation from said main generator to provide a dynamic braking circuit, an exciter machine arranged to exciting said main generator field winding and having a field exciting winding, means for exciting said exciter field winding, and a saturable core reactor having an alternating current winding and a direct current winding, means for energizing said reactor alternating current winding, said reactor direct current winding being connected across at least a part of said resistance means for energization responsive to the voltage drop thereacross, said reactor having another direct current winding arranged thereon in opposition to said first mentioned direct winding and connected for energization responsive to the output of said exciter, said reactor alternating current winding being connected in circuit with said exciter field winding exciting means for varying the excitation of said exciter differentially responsive to said voltage drop across said resistance means and said exciter output whereby the excitation supplied by said main generator to said motor field winding is regulated so that the armature current of said motor is automatically maintained at a substantially constant value during braking.

10. In a self-propelled vehicle, a main generator having a field exciting winding, a traction motor connected to drive the wheels of said vehicle and having an armature and a field exciting winding, braking resistance means, means for connecting said motor armature in a loop circuit with said resistance means and for connecting said motor field winding for energization from said main generator to provide a dynamic braking circuit, an exciter machine arranged for exciting said main generator field winding and having a field exciting winding, means for exciting said exciter field winding, and a saturable core reactor having an alternating current winding and a direct current winding, means for energizing said reactor alternating current winding, said reactor direct current winding being connected across at least a part of said resistance means for energization responsive to the voltage drop thereacross, said reactor having another direct current winding arranged thereon connected for energization responsive to the speed of said vehicle, said reactor alternating current winding being connected in circuit with said exciter field winding exciting means for varying the excitation of said exciter responsive to said voltage drop across said resistance means and the speed of said vehicle whereby the excitation supplied by said main generator to said motor field winding is regulated so that the armature current of said motor is automatically limited during braking to provide tapered braking.

11. In combination, a main generator having a field winding, a motor having an armature and a field exciting winding, braking resistance means, means for connecting said motor armature in a loop circuit with said resistance means and for connecting said motor field winding for excitation from said main generator to provide a dynamic braking circuit, an exciter machine arranged for exciting said main generator field winding and having a field exciting winding, means for exciting said exciter field winding, and a saturable core reactor having an alternating current winding and at least one direct current winding, means for energizing said alternating current windings, one of said reactor direct current windings being connected for energization responsive to the output current of said main generator, another of said reactor direct current windings being connected for energization responsive to manual braking control, another of said reactor direct current windings being connected for energization responsive to the output of said exciter, another of said reactor direct current windings being connected across at least a part of said resistance means for energization responsive to the voltage drop thereacross, said reactor alternating current windings being connected in circuit with said exciter field winding exciting means for varying the excitation of said exciter responsive to the energization of said reactor direct current windings whereby the excitation supplied by said main generator to said motor field winding is regulated so that said manual braking control is automatically overridden to limit motor armature current during braking.

12. In combination, a main generator having a field exciting winding, a motor having an armature and a field exciting winding, braking resistance means, means for connecting said motor armature in a loop circuit with said resistance means and for connecting said motor field winding for excitation from said main generator to produce a dynamic braking circuit, an exciting machine arranged for exciting said main generator field winding and having a field exciting winding, means for exciting said exciter field winding, and a plurality of saturable core reactors each having an alternating current winding and at least one direct current winding, means for energizing said alternating current windings, one of said reactor direct current windings being connected for energization responsive to manual braking control, another of said reactor direct current windings being connected across at least a part of said resistance means for energization responsive to the voltage drop thereacross, said reactor alternating current windings being connected in circuit with said exciter field winding exciting means for varying the excitation of said exciter responsive to the energization of said reactor D.-C. windings whereby the excitation supplied by said main generator to said motor field winding is regulated so that the said manual braking control is automatically overridden to limit said motor armature current during braking.

13. In a self-propelled vehicle, a main generator having a field exciting winding, a traction motor connected to drive the wheels of said vehicle and having an armature and a field exciting winding, braking resistance means, means for connecting said motor armature in a loop circuit with said resistance means and for connecting said motor field windings for excitation from said main generator to provide a dynamic braking circuit, exciting machine arranged for exciting said main generator field winding and having a field exciting winding, means for exciting said exciter field winding, and a plurality of saturable core reactors each having an alternating current winding and at least one direct current winding, means for energizing said alternating current windings, one of said reactor direct current windings being connected for energization responsive to manual braking control, another of said direct current windings being connected across at least a portion of said resistance means for energization responsive to the voltage drop across, another of said reactor direct current windings being connected for energization responsive to the speed of said vehicle, said reactor alternating current windings being connected in circuit with said exciter field winding exciting means for varying the excitation of said exciter responsive to the energization of said reactor direct current windings whereby the excitation supplied by said main generator to said motor field winding is regulated so that said manual braking control is automatically overridden to limit said motor armature current and to provide tapered braking.

14. In combination, a main generator having a field winding, a motor having an armature and a field exciting winding, braking resistance means, means for connecting said motor armature in a loop circuit with said resistance means and for connecting said motor field winding for excitation from said main generator to provide a dynamic braking circuit, an exciter machine arranged for exciting said main generator field winding and having a field exciting winding, means for exciting said exciter field winding, and a plurality of saturable core reactors each having an alternating current winding and at least one direct current winding, means for energizing said alternating current windings, one of said reactor direct current windings being connected for energization responsive to the output of said exciter, another of said reactor direct current windings being connected across at least a portion of said resistance means for energization responsive to the voltage drop thereacross, said last mentioned reactor direct current winding being in opposition to said first mentioned reactor direct current winding, another of said reactor direct current windings being connected for energization responsive to the speed of said vehicle, said reactor alternating current windings being connected in circuit with said exciter field winding exciting means for varying the excitation of said exciter responsive to the energization of said reactor direct current windings whereby the excitation supplied by said main generator to said motor field winding is regulated so that the armature current of said motor is automatically limited during braking and to provide tapered braking.

AUGUST V. JOHANSSON.

REFERENCES CITED

The following references are of record in the file of this patent:

UNITED STATES PATENTS

| Number | Name | Date |
| --- | --- | --- |
| 2,280,991 | Wickerham et al. | Apr. 28, 1942 |
| 2,440,319 | Wickerham | Apr. 27, 1948 |